United States Patent [19]
Findley

[11] 3,950,785
[45] Apr. 13, 1976

[54] MINIATURE TAPE CARTRIDGE WITH ADAPTOR FOR USE WITH EIGHT TRACK CARTRIDGE MACHINES

[76] Inventor: Roger Findley, 302 Gentry, Spring, Tex. 77373

[22] Filed: Nov. 21, 1974

[21] Appl. No.: 525,721

[52] U.S. Cl. .................. 360/94; 360/132; 242/197
[51] Int. Cl.² ................. G11B 23/04; G11B 15/18
[58] Field of Search .............. 360/94, 137, 132, 93; 242/197, 198, 199, 200, 55.19 A

[56] References Cited
UNITED STATES PATENTS

| | | | |
|---|---|---|---|
| 3,821,808 | 6/1974 | Wada et al. | 360/94 |
| 3,849,798 | 11/1974 | Oro | 360/94 |

*Primary Examiner*—Alfred H. Eddleman
*Attorney, Agent, or Firm*—Torres & Berryhill

[57] ABSTRACT

Disclosed is a magnetic recording tape cartridge assembly for use with conventional eight-track cartridgetype tape machines. The tape cartridge assembly comprises a miniature tape cartridge element engageable with a tape cartridge adaptor unit which is employed to hold and insert the cartridge element into the tape machine. The cartridge element includes an endless loop of magnetic recording tape onto which is recorded a single musical selection of approximately 3 to 4 minutes in length. In the preferred embodiment, the adaptor has a single cartridge receiver end portion including mounting pin members on which the cartridge element is placed and held stationary. The cartridges are interchangeable with the adaptor allowing a single adaptor unit to be used with a plurality of cartridge elements. In a modified form of the invention, the cartridge adaptor unit includes cartridge receiver portions at each end allowing two cartridges to be carried on the adaptor.

20 Claims, 7 Drawing Figures

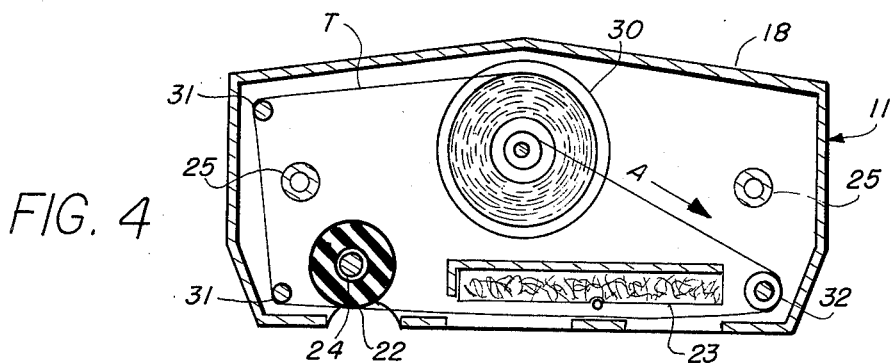
FIG. 4
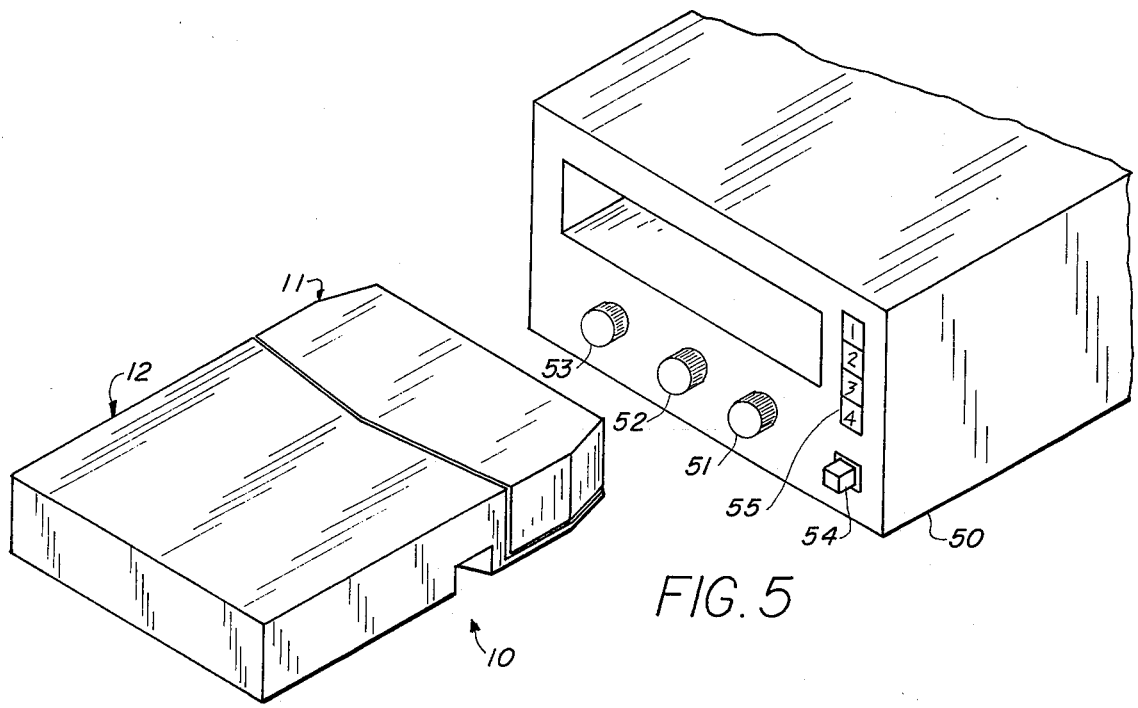
FIG. 5
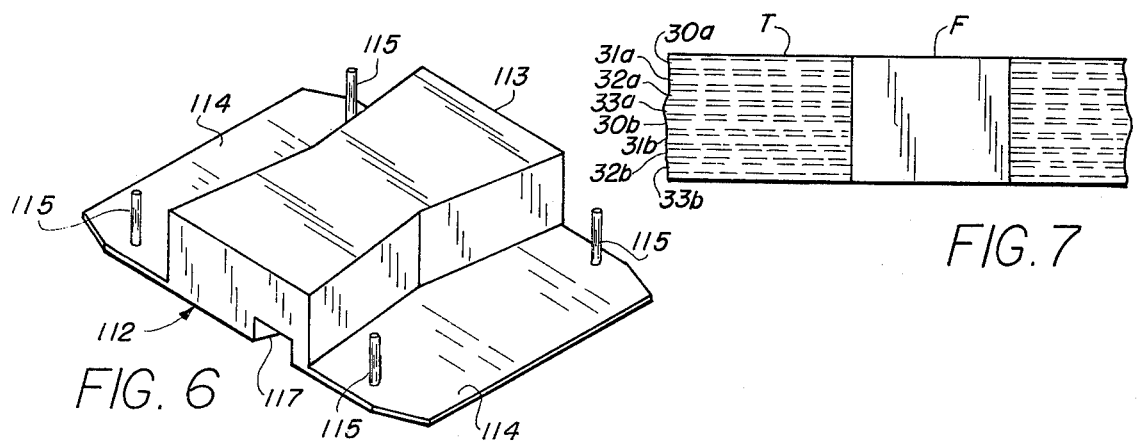
FIG. 6
FIG. 7

MINIATURE TAPE CARTRIDGE WITH ADAPTOR FOR USE WITH EIGHT TRACK CARTRIDGE MACHINES

BACKGROUND OF THE INVENTION

1. Field of the Invention

The present invention relates to packaging and mounting of magnetic recording tape whereby a single relatively short recording may be played back on a conventional eight-track tape machine. More particularly, the present invention relates to a two-piece eight-track tape cartridge assembly which includes a miniature tape cartridge element containing a short selection of recorded material and a tape cartridge adaptor unit which allows the cartridge element to be used with conventional eight-track cartridgetype tape machines.

2. Brief Description of the Prior Art

Tape cartridges on which musical and/or spoken selections are recorded for playback on car and/or home entertainment systems are well known. An example of one of the more common types of cartridges is the conventional eight-track cartridge having an endless loop of magnetic recording tape disposed therein. The eight-track cartridge has eight recording tracks and, in a stereo recording, two recording tracks are recorded and/or played back simultaneously.

The endless loop of magnetic tape is normally provided with a signalling element comprising a short length of metal foil. The metal foil is employed to signal the eight-track machine that the end of the recording track has been reached. The tape machine employs circuitry to sense the metal foil and automatically switch the head from one pair of recording tracks to the adjacent pair of recording tracks. A pair of recording tracks provides a program so that there are four programs on a conventional eight-track tape. These programs are automatically played sequentially by the machine. Conventional eight-track tape machines also employ circuitry to permit manual program selection.

The common practice of the musical tape recording industry is to produce eight-track cartridges having a number of selections in each program. For example, a single cartridge will generally have at least ten or more musical selections. Thus, each program may have two or more selections.

Those familiar with eight-track cartridge tapes know that they are easy to use since they do not require any threading. They also have disadvantages such as poor access to a desired selection. Many times, a cartridge tape may have from thirty to ninety minutes of recorded programming, and each recording track may be from 7½ minutes to 22½ minutes in length. If a person wants to hear only a particular selection from a program, it may be necessary to first listen to as much as 7 to 20 minutes or more of undesired programming.

One solution that many of the more expensive eight-track tape machines have provided is a "fast forward" capability which moves the tape at a faster rate; for example, twice the normal recorded rate. While providing a solution to the problem of access, the "fast forward" feature is expensive and does not entirely eliminate the problem.

Another disadvantage of the conventional eighttrack cartridge is that in many instances, there may be only one or two selections out of the ten or more on a particular cartridge which are desired. The large number of selections present on conventional cartridges makes them both expensive and bulky.

SUMMARY OF THE INVENTION

The present invention provides a tape cartridge assembly compatible with conventional eight-track cartridge-type tape machines. The tape cartridge of the present invention is a two-piece assembly comprising a miniature tape cartridge element and a tape cartridge adaptor unit which is employed to hold the miniature tape cartridge element so that it may by used in conventional eight-track tape machines.

The miniature tape cartridge element is similar to a conventional eight-track tape cartridge in that it employs an endless loop of magnetic recording tape on a "take-up" spool, a resilient drive wheel, internal tape guide means, and apertures for receiving the recording and/or playback head of the tape machine, track sensing element and drive motor shaft. The tape cartridge element also includes mounting holes permitting it to be removably carried by the adaptor unit.

The tape cartridge adaptor unit comprises a main body portion and a cartridge element receiver end portion which contains mounting pins insertable into the mounting holes on the cartridge element. The main body portion combined with the cartridge element produces an assembly having dimensions similar to a conventional eight-track cartridge so that the assembly is compatible with a conventional eighttrack tape machine.

In a modified version of the present invention, the tape cartridge adaptor has cartridge element receiver end portions at each of its ends.

In one embodiment of the cartridge assembly, a single musical selection is recorded on each program of the four-program tape. The elapsed time required to reach the beginning of a selection is not greater than the time of the selection.

In a modified form, a shorter tape is used and each program has only one-fourth of a single recorded selection thereon. In this latter form, by manually actuating the program selector of the machine, the time required to reach the beginning of the single selection is no longer than one-fourth of the playback time of the entire tape.

From the foregoing, it will be appreciated that one of the objects of the present invention is to provide a tape cartridge assembly compatible with conventional eight-track cartridge-type tape machines having a greater versatility by employing interchangeable cartridge elements and a cartridge adaptor unit.

Another object of the present invention is to provide an eight-track cartridge having shorter programs than those of conventional eight-track cartridges.

Still another object of the present invention is to provide a compact, easily stored cartridge which may be played back on conventional eight-track tape machines.

Yet another object of the present invention is to provide a short time length eight-track cartridge element which may be releasably mounted on a single adaptor unit.

A further object of the present invention is to provide an inexpensive, eight-track cartridge element having only desired prerecorded programming so that there is no need to purchase expensive conventional prerecorded eight-track cartridges having a plurality of undesired selections.

Another object of the present invention is to provide an eight-track tape cartridge in which access to the beginning of the desired selection can be more quickly achieved than is possible with conventional cartridges.

Other features, objects and advantages of the present invention will become readily apparent from the accompanying drawings, specification and claims.

BRIEF DESCRIPTION OF THE DRAWINGS

FIG. 4 is a cross sectional view taken along the line 4—4 of FIG. 3 illustrating the internal construction of the cartridge element of the present invention;

FIG. 5 is a view illustrating the two-piece tape cartridge assembly of the present invention and a portion of a conventional eight-track tape machine;

FIG. 6 is a view illustrating a modified form of the tape cartridge adaptor of the present invention; and FIG. 7 illustrates a portion of a magnetic recording tape.

DESCRIPTION OF THE ILLUSTRATED EMBODIMENTS

Figure 1:
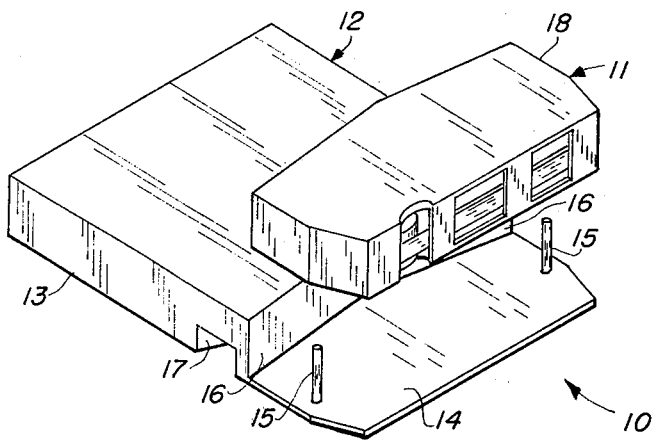
FIG. 1 is a view illustrating the two-piece tape cartridge of the present invention, with the tape cartridge element being placed onto the adaptor unit.

Referring to the drawings, and more specifically to FIG. 1, the two-piece magnetic tape cartridge assembly of the present invention is indicated generally at 10. The two-piece cartridge assembly comprises a miniature tape cartridge element 11 and a tape cartridge adaptor unit 12. The cartridge adaptor 12 includes a main body portion 13 and a cartridge receiver end portion 14. The end portion 14 is equipped with vertically disposed mounting pin means 15 and concave dihedral surfaces 16 adapted to engage opposing dihedral surfaces on the cartridge element 11. The combined overall dimensions of the element 11 mounted on the cartridge adaptor unit 12 are substantially similar to a conventional eighttrack cartridge. When the cartridge element 11 and the cartridge adaptor 12 are combined, the assembly 10 may be inserted into the tape opening and operatively engaged with the playback and/or record head of a conventional eight-track tape machine.

Figure 2:
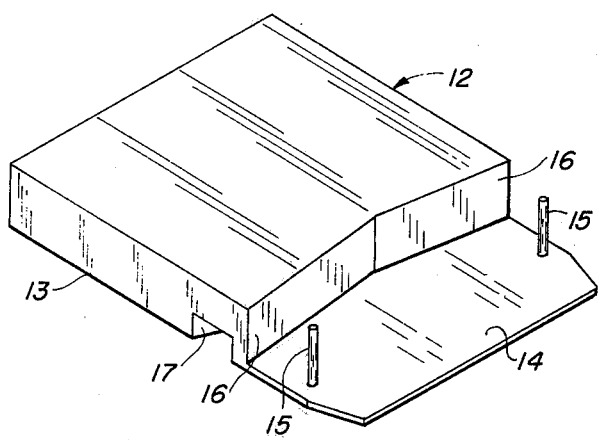
FIG. 2 illustrates the cartridge adaptor unit of FIG. 1.

The cartridge adaptor 12 is best illustrated in FIG. 2. The main body portion 13 of the cartridge adaptor 12 has a notch 17 which is employed, as with a conventional cartridge, to hold the cartridge stationary when it is inserted in a tape machine.

The main body portion 13 of the cartridge adaptor 12 may be of any desired shape and does not necessarily have to be constructed as illustrated in FIG. 2. The construction is only important to the extent that the dimensions of the cartridge adaptor 12 must be operatively receivable in the cartridge opening of a conventional eight-track tape machine.

Figure 3:
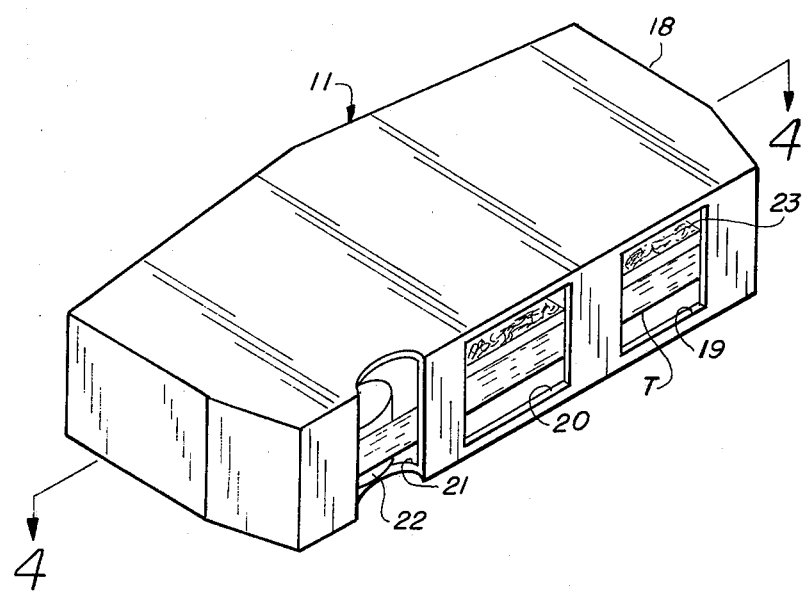
FIG. 3 is an enlarged illustration of the cartridge element of FIG. 1.

Referring jointly to FIGS. 1 and 3, the cartridge element 11 includes a housing 18 having end apertures 19, 20 and 21 in which the tape track-change sensing element, recording and/or playback head and tape drive shaft, respectively, are inserted when the cartridge is placed in the tape machine. Mounting holes 25 (in FIG. 4) located on the under side of the housing 18 fit over the pins 15 on the cartridge adaptor 12 to properly position the housing on the adaptor.

The internal construction of the tape cartridge element 11 is best illustrated in FIG. 4. Disposed in the cartridge element 11 is an endless loop of magnetic recording tapt T and a resilient tape drive wheel 22. A resilient member 23 biases the tape T into engagement with the tape head and sensing element of the tape machine (not illustrated). The endless loop of magnetic recording tape T is wound on a take-up spool 30 disposed in the cartridge 18. The drive wheel 22 is mounted for rotational movement on a shaft 24. When the drive wheel 22 is in engagement with the drive shaft (not illustrated) of the tape machine, the tape T is advanced in the direction indicated by the arrow A. To reduce frictional drag on the tape T suitable guides 31 and 32 are employed.

FIG. 5 illustrates the preferred form of the present invention with the cartridge element 11 placed on the cartridge adaptor 12 and ready for insertion into a conventional eight-track tape machine 50. It should be appreciated that the tape machine 50 is of conventional design and includes the standard controls normally provided on such machines, i.e. volume control 51, balance control 52, tone control 53, program selector 54 and program selection indicator 55.

Referring to FIG. 7, it may be seen that the tape T has eight recording tracks $30a$, $30b$, $31a$, $31b$, $32a$, $32b$, and $33a$, $33b$, as indicated by phantom lines for purposes of explanation. The recording tracks are not actually visible. In a stereophonic recording, the left channel is recorded on one track and the right channel is recorded on a second recording track. By way of example, recording tracks $30a$ and $30b$ represent one program, tracks $31a$ and $31b$ a second program and so forth. The particular program being played or recorded at any given time is displayed by the program indicator 55 (FIG. 5). A signalling element comprised of metal foil F is disposed on the magnetic tape T to signal the tape machine that the end of the recording track has been reached. Upon sensing the metal foil F, the tape machine automatically changes to the next program which is displayed by the program indicator 55 of FIG. 5. These changes automatically occur sequentially in the order 1, 2, 3, 4.

In one embodiment of the present invention, the tape T has a single musical selection recorded on one program, for example tracks $30a$ and $30b$. The length of time required for one program to play is approximately 3 to 4 minutes. Accordingly, the tape T has a length which, from start to finish, requires approximately 3 to 4 minutes of elapsed time to complete a single revolution when advanced at the conventional recording and playback rate. With such an arrangement, it is not necessary to listen to more than four minutes of undesired programming.

In a modified form, each tape T may have four programs, each with only one-fourth of a musical selection recorded thereon, thus reducing the length of time to reach the beginning of the selection to one-fourth of the total playing time of the musical selection. In such an arrangement, the program selector may be manually actuated such that it is necessary to listen to a maximum of only one minute of undesired programming before the beginning of a conventional three- to four-minute musical selection recorded on the tape. Cartridges having this latter feature would have one-fourth of the musical selection recorded on each program. The metallic signalling means carried on the tape would cause the machine to switch to the next program in an established sequence each time a revolution of the tape is completed. If the tape is only part way through a complete revolution when it is inserted into the machine, the machine need only be manually advanced to program 4 before the signalling means on the tape reaches the playback head. Thereafter, when the tape reaches the playback head, the machine automatically changes to the start of program 1 when the musical selection also begins.

A modified embodiment of the cartridge adaptor of the present invention is indicated generally at 112 in FIG. 6. The cartridge adaptor 112 is capable of receiving two cartridge elements (FIG. 3) to provide greater versatility by allowing two cartridge elements to be placed on a single adaptor. The adaptor includes mounting pins 115 which engage the mounting holes 25 provided on cartridge elements 11.

From the foregoing, it should be appreciated that the tape cartridge assembly of the present invention provides a miniature eight-track tape cartridge assembly compatible with conventional eight-track tape machines. The miniature tape cartridge element also provides an eight-track tape cartridge system which, when compared with the conventional eight-track cartridge, requires a shorter elapsed time to run the entire length of tape T past the face of the catridge.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A magnetic tape cartridge assembly for use with a conventional eight-track tape machine comprising:
   a. a cartridge adaptor unit for carrying at least one tape cartridge element;
   b. a tape cartridge element containing a length of magnetic recording tape; and
   c. mounting means on said adaptor unit for removably mounting said cartridge element on said adaptor unit, said adaptor unit and cartridge element, when assembled, having dimensions permitting said magnetic recording tape to be physically connected with the playback and/or recording head of said eight-track tape machine.

2. A magnetic tape cartridge assembly as defined in claim 1 wherein said magnetic recording tape comprises an endless loop.

3. A magnetic tape cartridge assembly as defined in claim 1 wherein said magnetic tape is of a length to provide an elapsed time of operation in said machine, from start to finish of said tape, of approximately only three to four minutes.

4. A magnetic tape cartridge assembly as defined in claim 2 wherein said magnetic tape is of a length to provide an elapsed time of operation in said machine, from one point on said loop back to the same point, of approximately three to four minutes.

5. A magnetic tape cartridge assembly as defined in claim 1 wherein said mounting means and said cartridge element include pin and hole means adaptable for interconnecting engagement with one another.

6. A magnetic tape cartridge assembly as defined in claim 1 wherein said cartridge adaptor unit includes a plurality of mounting means for simultaneously mounting a plurality of said tape cartridge elements.

7. A magnetic tape cartridge assembly as defined in claim 6 wherein said mounting means are positioned at opposing ends of said cartridge adaptor unit.

8. A magnetic tape cartridge assembly as defined in claim 2 wherein:
   a. said magnetic tape has a plurality of recording tracks recorded thereon and is of a total length to provide approximately only one minute of playback time on said tape machine; and
   b. signalling means are disposed on said tape for causing said machine to change from playing back one recording track to playing back another recording track at the completion of a single revolution of said tape.

9. A magnetic tape cartridge assembly as defined in claim 2 wherein eight tracks of recording are recorded on said magnetic tape, said recording tracks providing four separate, two channel musical selections.

10. A magnetic tape cartridge assembly as defined in claim 3 wherein eight tracks of recording are recorded on said magnetic tape, said recording tracks providing four separate, two channel musical selections.

11. A magnetic tape cartridge assembly as defined in claim 2 wherein said mounting means and said cartridge means include pin and hole means adaptable for interconnecting engagement with one another.

12. A magnetic tape cartridge assembly as defined in claim 11 wherein said cartridge adaptor unit includes a plurality of mounting means for simultaneously mounting a plurality of said tape cartridge elements.

13. A magnetic tape cartridge assembly as defined in claim 4 wherein said mounting means and said cartridge means include pin and hole means adaptable for interconnecting engagement with one another.

14. A magnetic tape cartridge assembly as defined in claim 4 wherein said cartridge adaptor unit includes a plurality of mounting means for simultaneously mounting a plurality of said tape cartridge elements.

15. A magnetic tape cartridge assembly as defined in claim 14 wherein said mounting means are positioned at opposing ends of said cartridge adaptor unit.

16. A magnetic tape cartridge assembly for use with a conventional eight-track tape machine comprising:
   a. a cartridge adaptor unit for carrying at least one tape cartridge element;
   b. a tape cartridge element containing a length of magnetic recording tape; and
   c. a plurality of mounting means included with said adaptor unit for simultaneously mounting a plurality of said tape cartridge elements, said adaptor unit and cartridge element, when assembled, having dimensions permitting said assembly to be operatively connected with the playback and/or recording head of said eight-track tape machine.

17. A magnetic tape cartridge assembly as defined in claim 16 wherein said mounting means are positioned at opposing ends of said cartridge adaptor unit.

18. A magnetic tape cartridge assembly for use with a conventional eight-track tape machine comprising:
   a. a cartridge adaptor unit for carrying at least one tape cartridge element;
   b. a tape cartridge element containing a length of magnetic recording tape in an endless loop;
   c. a plurality of mounting means on said adaptor unit for removably mounting, simultaneously, a plurality of said tape cartridge elements, said adaptor unit and cartridge element, when assembled, having dimensions permitting said assembly to be operatively connected with the playback and/or recording head of said eight-track tape machine; and
d. pin and hole means included in said mounting means and said cartridge element adaptable for interconnecting engagement with one another.

19. A magnetic tape cartridge assembly for use with a conventional eight-track tape machine comprising:
a. a cartridge adaptor unit for carrying at least one tape cartridge element;
b. a tape cartridge element containing an endless loop of magnetic recording tape of a length to provide an elapsed time of operation in said machine, from start to finish of said tape, of approximately only three to four minutes; and
c. a plurality of mounting means included with said adaptor unit for simultaneously mounting a plurality of said tape cartridge elements, said adaptor unit and cartridge element, when assembled, having dimensions permitting said assembly to be operatively connected with the playback and/or recording head of said eight-track machine.

20. A magnetic tape cartridge assembly as defined in claim 19 wherein said mounting means are positioned at opposing ends of said cartridge adaptor unit.

* * * * *